May 20, 1941.　　F. B. YINGLING　　2,242,692
CAR WASHER
Filed March 31, 1938　　9 Sheets-Sheet 5
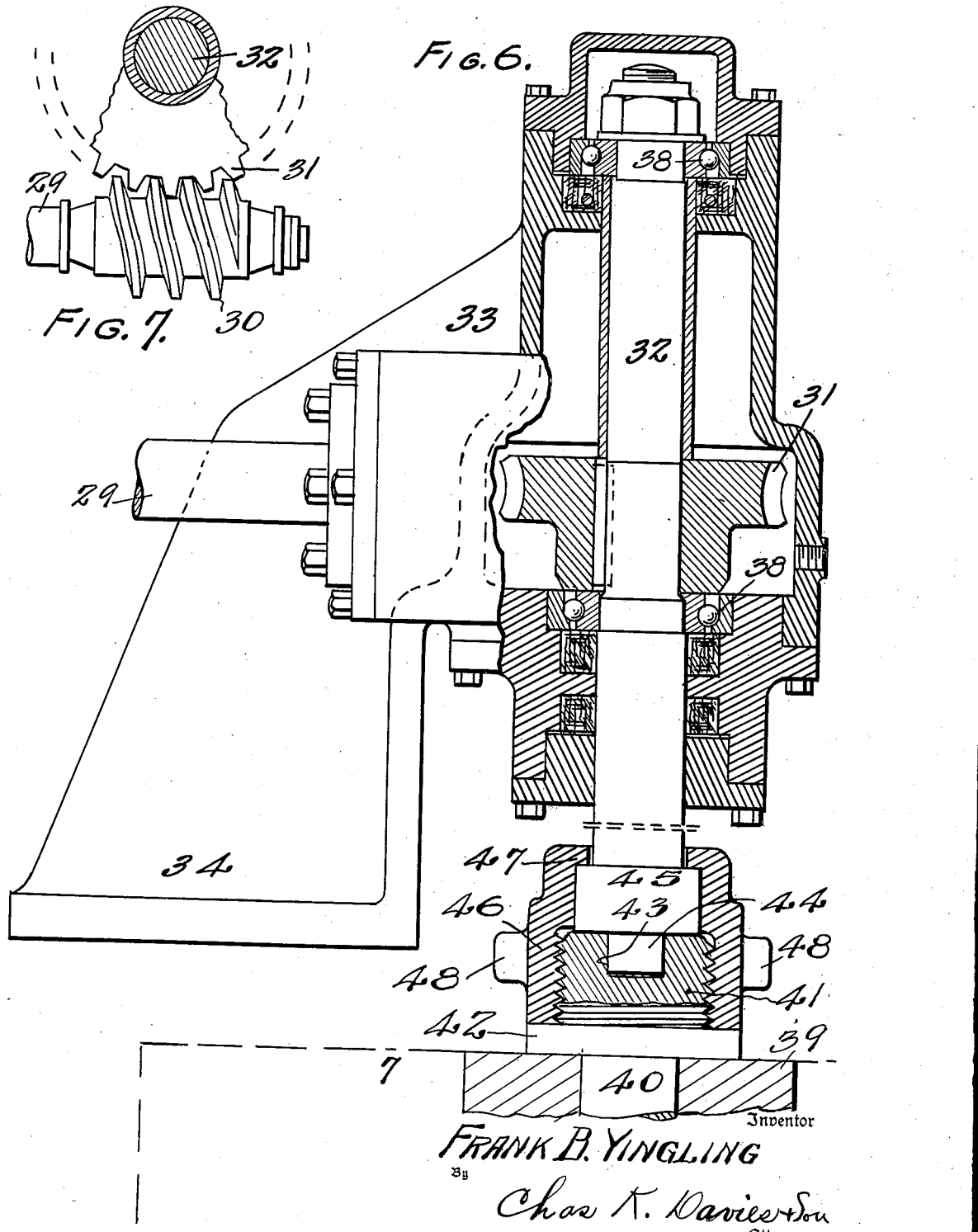
Inventor
FRANK B. YINGLING
By
Chas K. Davies + Son
Attorney

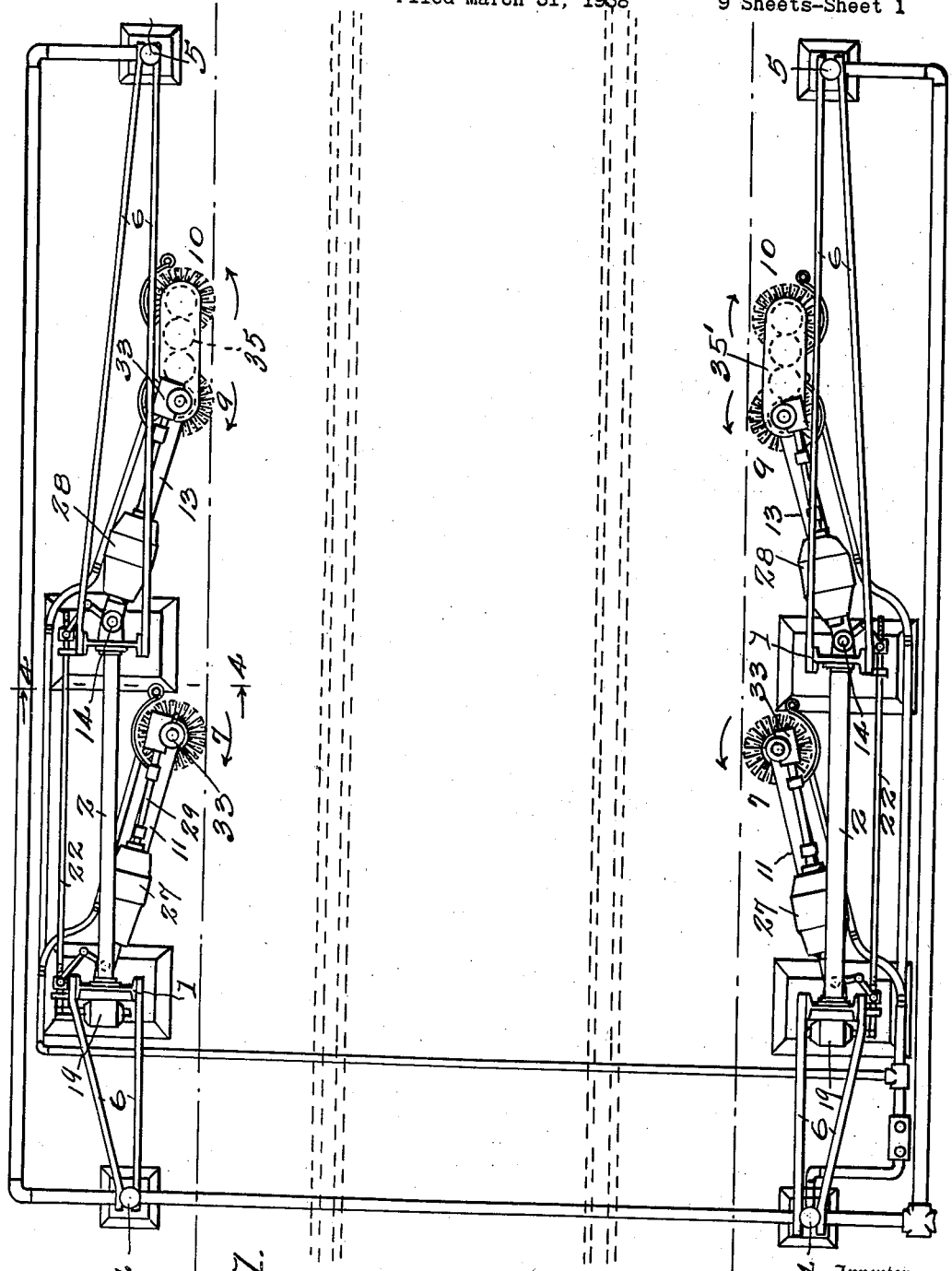

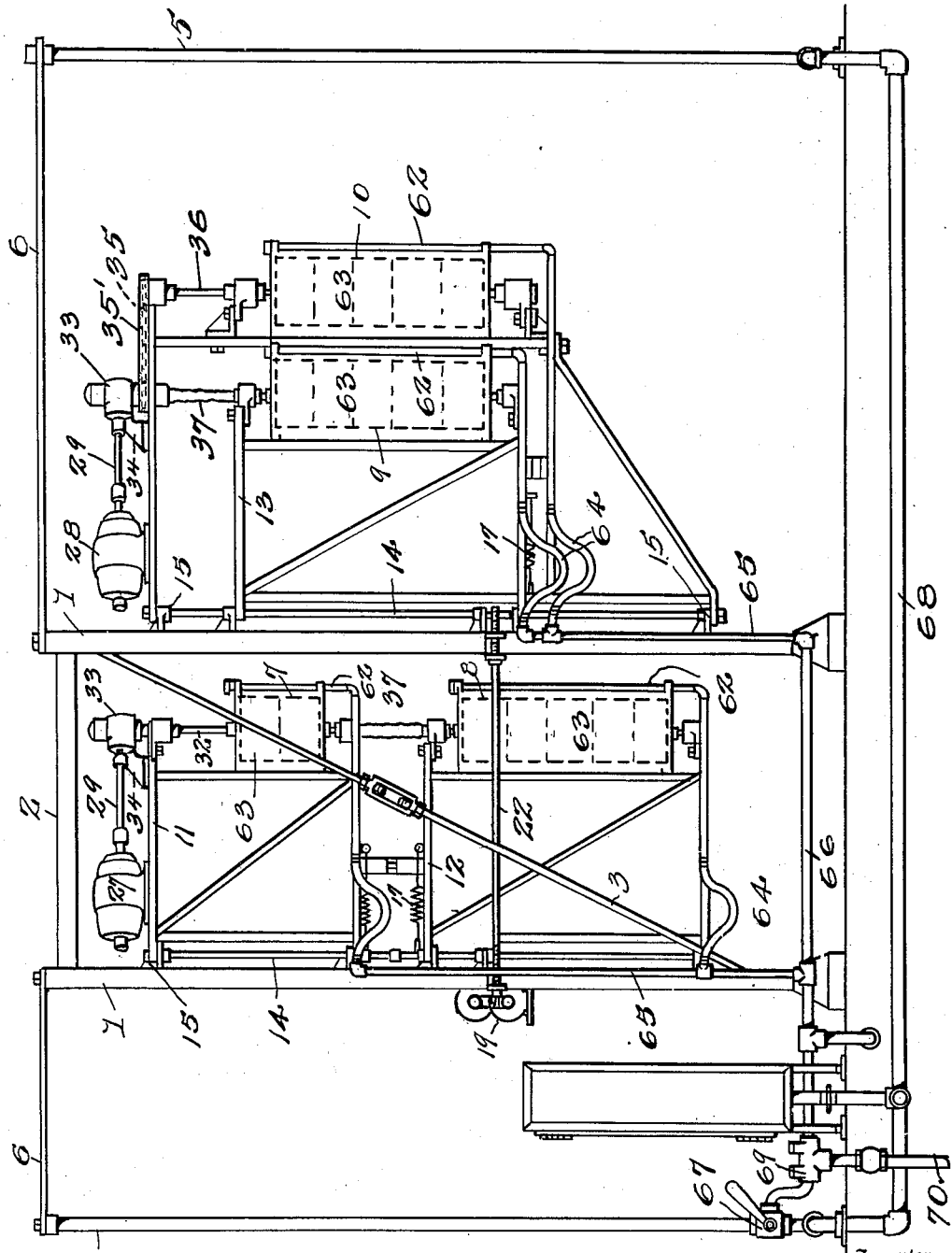

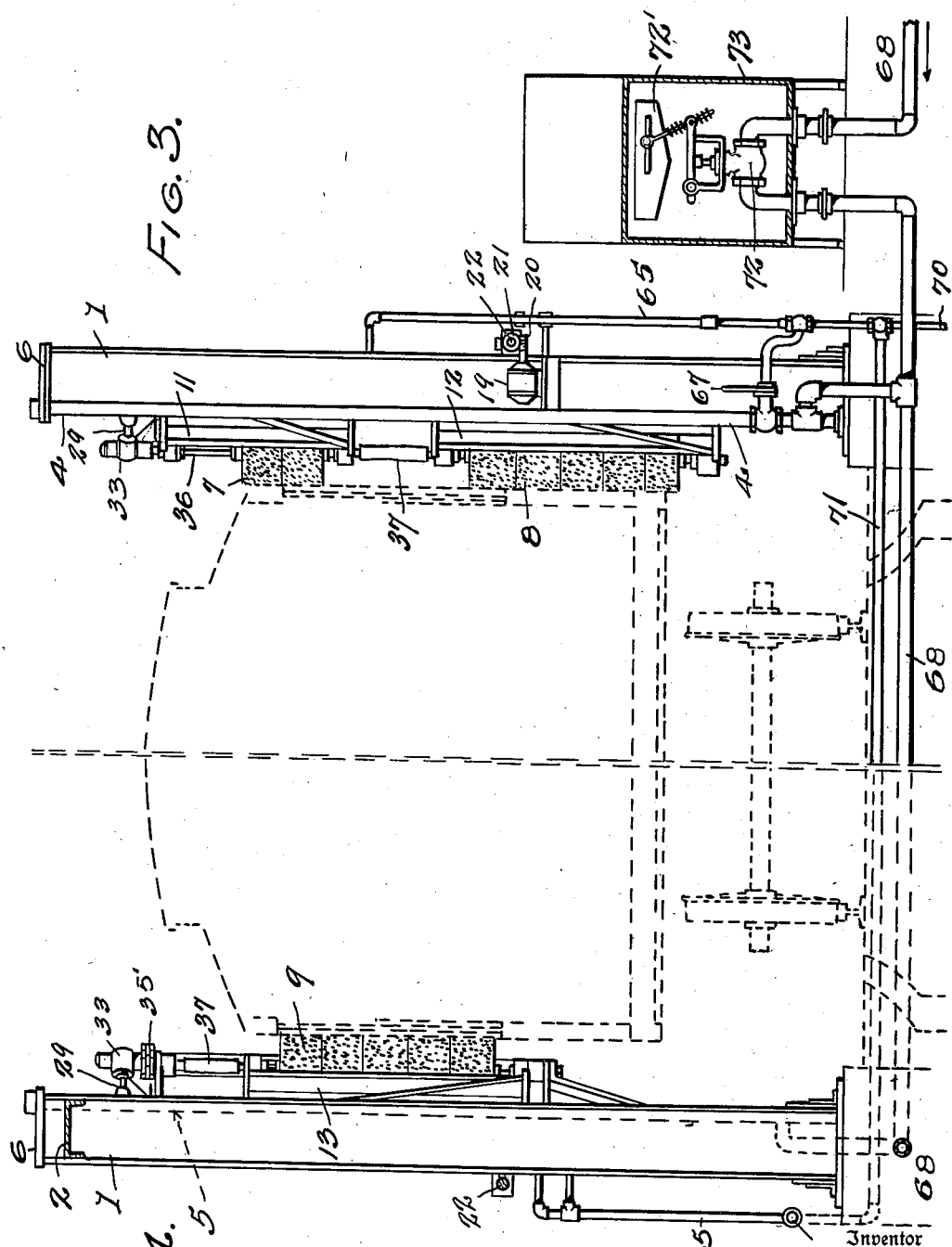

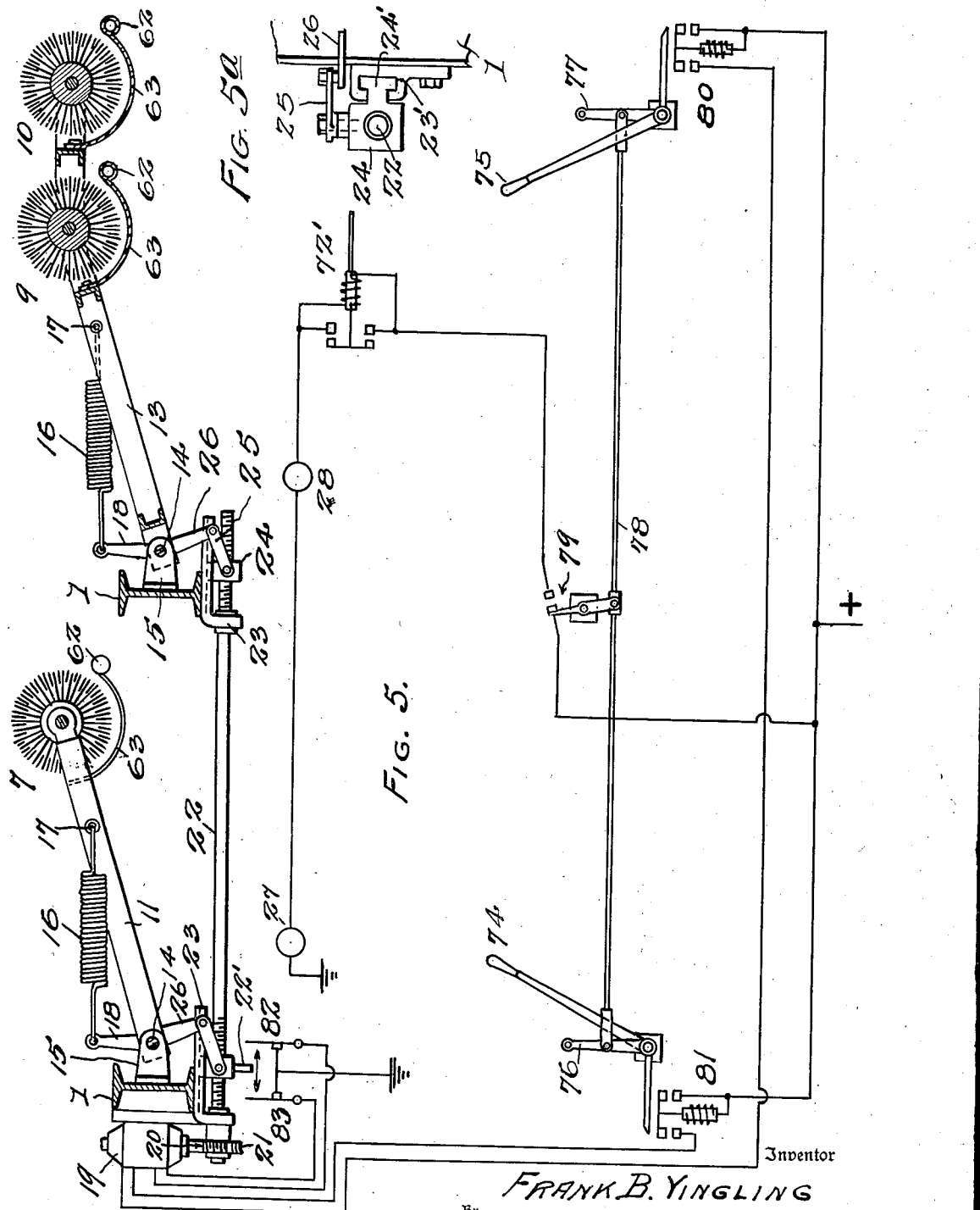

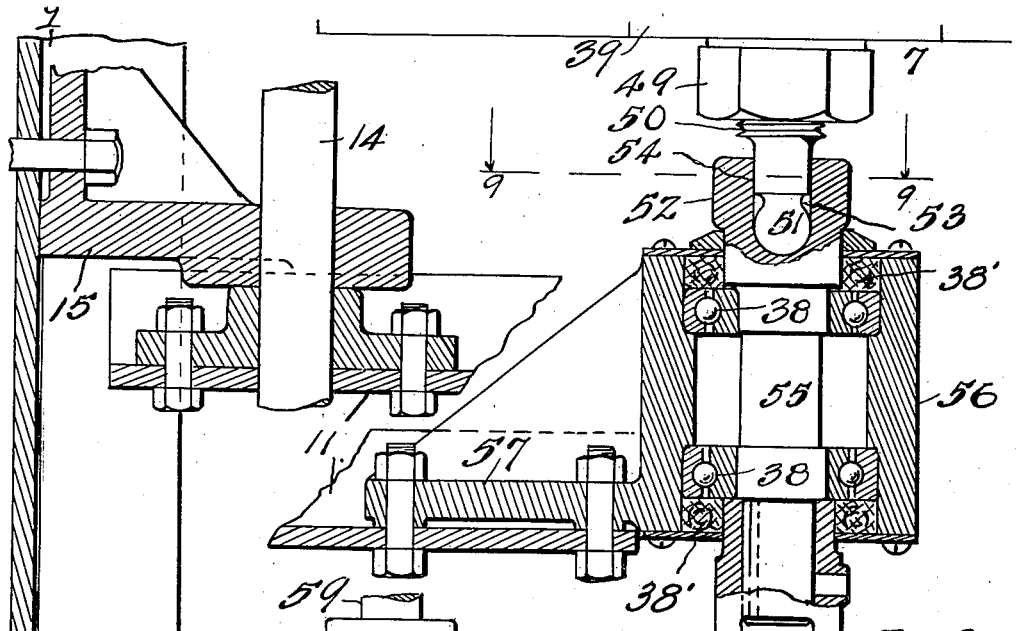

May 20, 1941. F. B. YINGLING 2,242,692
CAR WASHER
Filed March 31, 1938 9 Sheets-Sheet 7
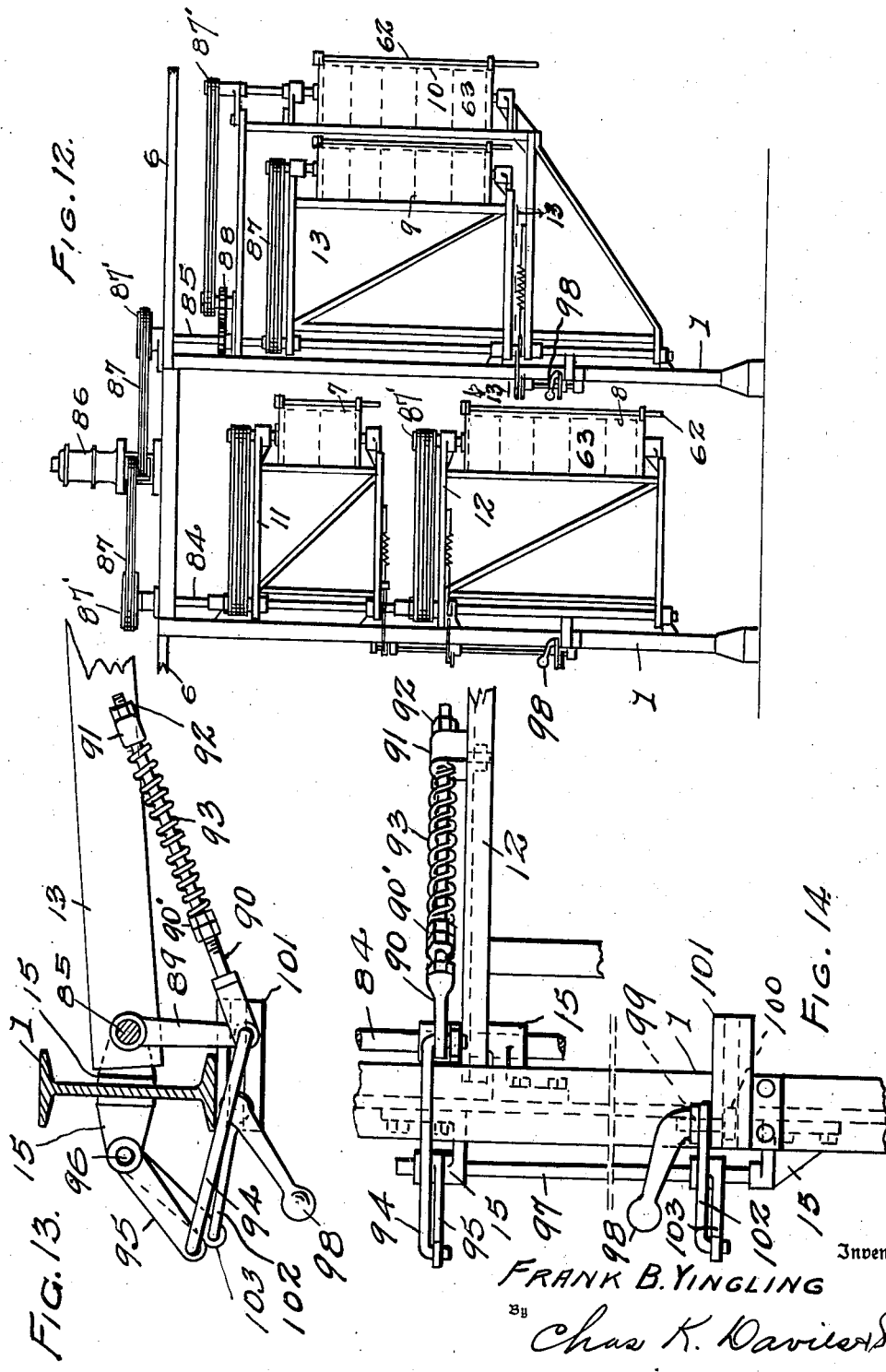
Inventor
FRANK B. YINGLING
By Chas K. Davidson
Attorney May 20, 1941. F. B. YINGLING 2,242,692
CAR-WASHER
Filed March 31, 1938 9 Sheets-Sheet 8
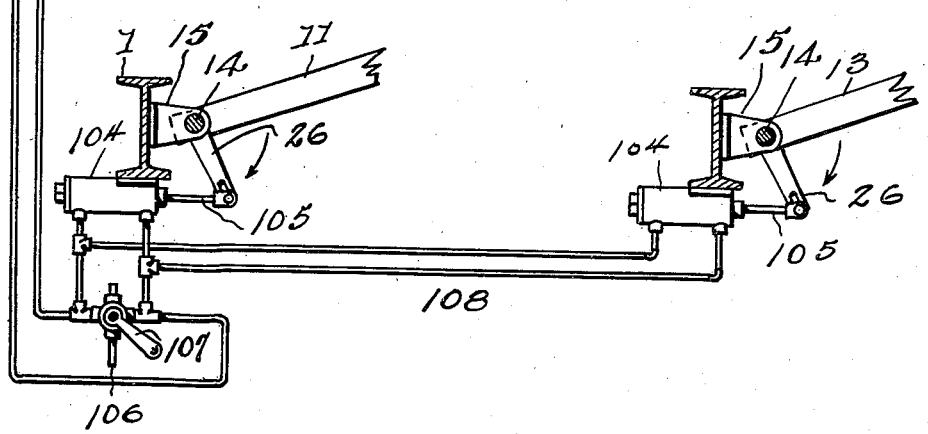
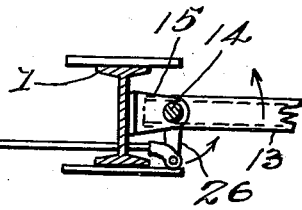
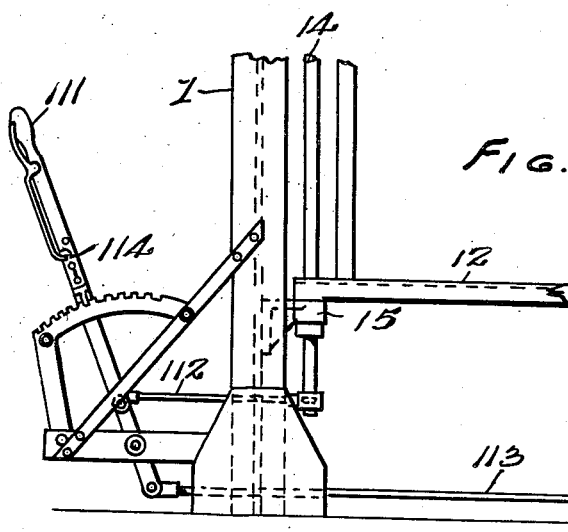
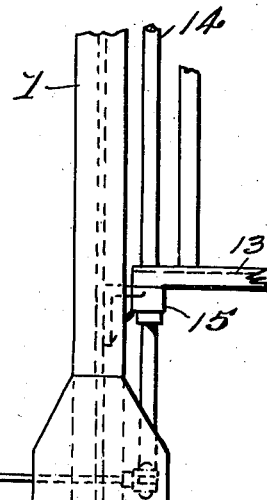
Inventor
FRANK B. YINGLING
By Chas K. Davies
Attorney

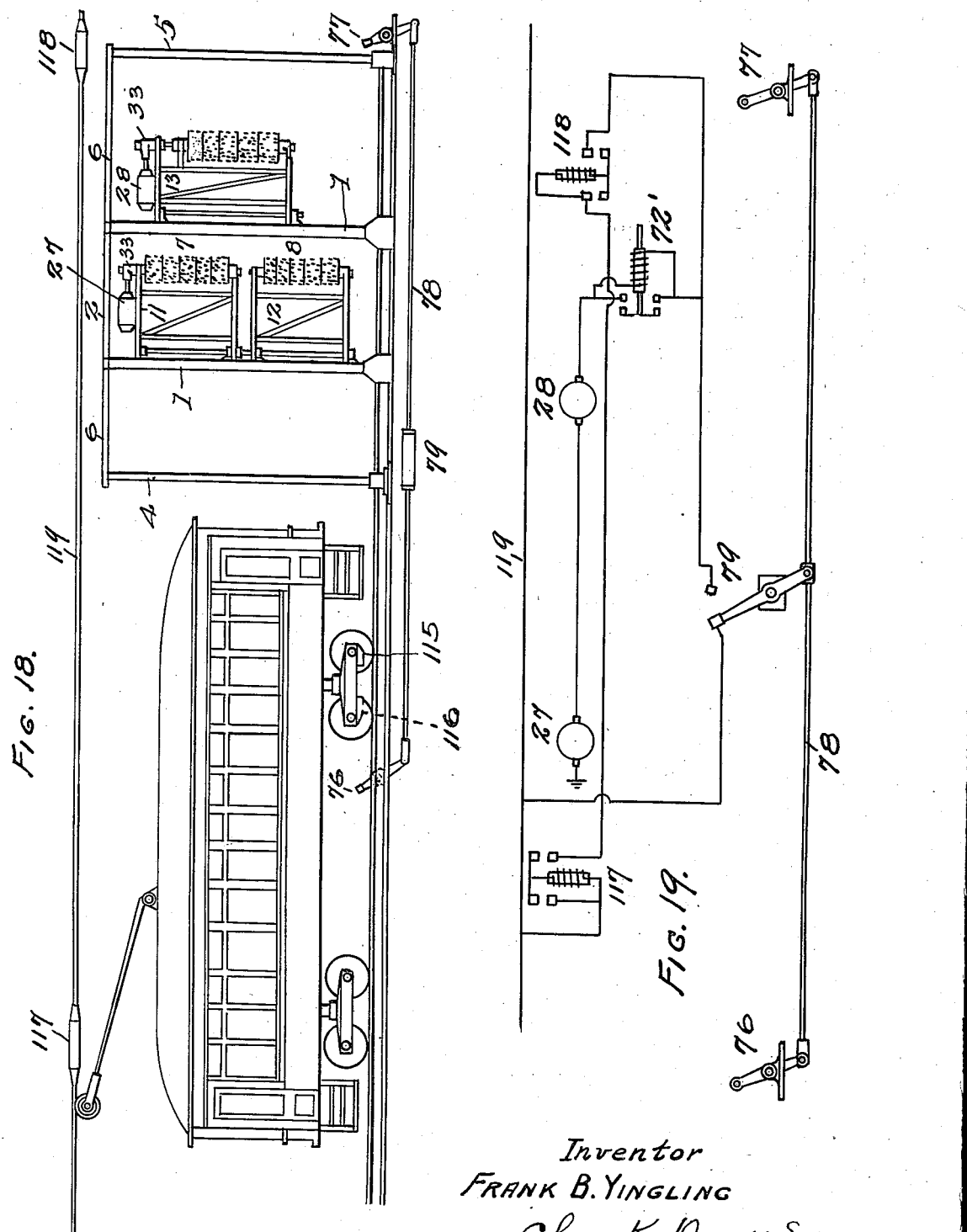

Patented May 20, 1941

2,242,692

UNITED STATES PATENT OFFICE 2,242,692

CAR WASHER

Frank B. Yingling, Hamilton, Ohio

Application March 31, 1938, Serial No. 199,303

7 Claims. (Cl. 15—53)

My present invention relates to an improved car washer which, while especially designed for use in washing various types of railway cars, is also readily adaptable for washing the exterior sides of other vehicles.

The invention involves a washing apparatus embodying the broad principles of the construction and operation illustrated in the patent of A. H. Leschke, No. 1,740,546 dated December 24, 1929, and the present invention consists in certain novel combinations, arrangements of parts, and features of construction, whereby the operation, construction, and manufacture of the above patented apparatus, is enhanced in numerous ways.

In carrying out my invention two complementary units are employed, one at each side of a track, and the car or vehicle to be washed passes between these units and is washed before it emerges from the passageway between the units. Each unit employs a number of rotary brushes having their vertical axes journaled in bearings supported on swinging frames. The several brushes, in sets, are operated by motors, preferably electric motors, mounted on the individual, swinging, brush frames, and these motors may be manually controlled, vehicle controlled, and automatically controlled by mechanical means as well as electrical means.

The swinging brush frames of each unit, may also be swung on their hinged or pivoted axes by means of individual motors mounted on the main frame of the washing machine, and the operation of these motors may be controlled automatically, by movement of the vehicle to be washed, or the frames may be swung on their axes, mechanically, by manually operating means, for setting the brushes in operative position to wash the sides of a vehicle, and to retract the brushes from operative position.

In the accompanying drawings I have illustrated one complete example of the physical embodiment of my invention wherein the parts are combined and arranged according to a preferred form of the invention, and in addition I have illustrated modifications in construction and operation of the washing machine involving the operating means for the brushes and for the swinging frames, and the drawings and description are therefore illustrative and descriptive, rather than as limiting the invention to any specific showing.

In the completely exemplified form of the invention illustrated in the drawings and described in the specification, the power operated brushes and the power operated brush-frames, which are respectively operated by electric motors on the brush-frames and similar motors on the main frame, are controlled, together with the water supply, to operate in synchronism and under a single control.

It will be understood that while the car washer as illustrated, is in successful operation, changes and alterations may be made, and are contemplated, in the construction and operation of the apparatus, within the scope of my claims, and without departing from the principles of my invention.

Figure 1 is a top plan view of the apparatus showing two complementary units, with the brushes in operative position, and indicating the car track and the sides of a car by dotted lines.

Figure 2 is a view in side elevation of the right-hand unit.

Figure 3 is a front end elevation of the right hand unit, as seen from the left in Figure 2, and Figure 4 is a vertical sectional view, as at line 4—4 of Figure 1, of the left hand unit, a car to be washed being shown by dotted lines between the units.

Figure 5 is a horizontal sectional view of parts in the right-hand unit, showing especially the electrically operated mechanism for swinging the brush-frames and brushes into and out of washing position, and showing also the electric wiring together with vehicle-control devices and manual control devices for the electric circuits. Figure 5a is a detail end elevation of the brush-frame adjusting mechanism in Figure 5.

Figure 6 is an enlarged, vertical sectional view showing the driving mechanism for a brush; and Figure 7 is a detail view showing the drive-worm and drive-gear of the driving mechanism in Figure 6.

Figure 8 is a detail view of a lower bearing for an upper brush, together with a portion of a flexible coupling between this upper brush and a lower, axially alined brush. Figure 9 is a transverse sectional view at line 9—9 of Figure 8 showing especially the ball-and-socket joint between the brush and its bearing.

Figure 10 is a sectional detail view similar to Figure 8, but showing the upper bearing for a lower brush, and a portion of the flexible coupling between the brushes of Figures 8 and 10.

Figure 11 is a detailed sectional view complementary to Figure 8, showing a pivot or hinge of the brush-frame of which the bearing of Figure 8 forms a part.

Figure 12 is an exterior elevation of part of the right-hand unit, wherein the pivot-shafts of the brush frames are utilized as operating shafts in the brush-driving mechanism, and power is transmitted by belts to the brushes.

Figure 13 is a view, as at line 13—13 of Figure 12, showing a manually operated means for swinging the brush-frames. Figure 14 is a view in elevation of the manually operated means of Figure 13 and adapted to two of the brush-frames in Figure 12.

Figure 15 is a top plan view of a motive fluid control mechanism for the swinging brush-frames.

Figure 16 is a plan view of a manually operated control mechanism for the swinging brush-frames, and Figure 17 is a view in elevation of this mechanism.

Figure 8 is a view in elevation showing a trolley car entering the washing apparatus, on a stub track, or return track, and Figure 19 is a diagrammatic view of the wiring for the electrically operated units, with the setting and retracting means and control for the brush-frames.

Inasmuch as the construction of the two units, and also the operation of the parts of the units, are similar, a specific description of one unit will suffice for both units, and so far as practicable, the same reference characters are employed to designate complementary parts in the two units. The railway track indicated by dotted lines in Figure 1 indicates a passageway between the two units, and the railway car indicated by dotted lines in Figure 4, may be a railway car of one of several types, or the vehicle may be an automotive vehicle instead of a railway car.

The car to be washed passes from left to right in Figure 1 between the two units and is washed enroute, and the car may continue on its way after passing through the apparatus, or, if the track is a stub-track, the washed car returns through the washing apparatus to its desired destination. In the latter event, the brushes which during the forward movement of the car were in operative position, are retracted to inoperative position to permit passage of the washed car on its return movement. Then, as the washed car emerges from the apparatus, the brushes may be re-set to operative position in readiness for a succeeding car to be washed.

In the simplified and preferred form of construction illustrated, the frames for the units comprise a pair of spaced, upright I-beams 1, 1, having suitable bases at each side of the track, and these I-beams are joined by a channel plate 2 disposed horizontally at the upper ends of the beams or posts, and a diagonal brace as 3 may be employed to take up any slack and to brace the structure, as indicated in Figure 2.

At the front of the apparatus, i. e. the left end in Figures 1 and 2 a pair of wetting pipes, or spray pipes 4, 4, are erected, one at each side of the track, to spray the sides of the car with water preparatory to the washing process, and suitable nozzles may be used in the spray pipes, if desired, for distributing the water under pressure, against the sides and windows of the car. At the rear end of the apparatus, that is, the right end in Figures 1 and 2, a pair of rinsing pipes, 5, 5, are erected, and these pipes spray the washed car for the purpose of removing any undesirable elements. The wetting pipes and the rinsing pipes, at their upper ends, are supported from the upright posts 1, 1, by means of braces 6, 6, and at their lower ends these two sets of pipes are properly supported in usual manner at the ground level or floor level.

As indicated in Figure 2, and as shown in other figures of the drawings I employ four brushes 7, 8, 9, and 10, at each side of the track, the brushes 7 and 8 being arranged in vertical axial alinement to wash the eaves portion of the side of the car and the lower or body portion of the car respectively. The brushes 9 and 10 are arranged as twin brushes with parallel vertical axes, and as indicated in Figure 4 these brushes revolve in contact with the window portions of the car, for the purpose of washing the windows and frames.

The brushes 7 and 8 are journaled to revolve in brush-frames 11 and 12, and the twin brushes are journaled to revolve in a frame 13, the direction of movement of the rotary brushes being indicated by the arrows in Figure 1.

The brush frames are hinged to swing toward and away from the car on a vertical axis, and such an axis is designated as 14, which is an upright rod or bar journaled in supporting brackets 15 attached to the posts 1. As best seen in Figure 5, each brush-frame is provided with a spring 16 anchored at one end at 17 to the frame, and at its other end anchored to a spring arm 18 that is rigidly mounted on the hinge-post of the frame, in order that the spring may have a tendency to pull the brushes into contact with the sides of the car as the latter passes between the brushes and in contact therewith.

Spring 16 is also instrumental in transmitting power from the arm 18 to the frame 11 when bar or rod 14 is turned clockwise to retract the brush.

One type of power-operated means employed for swinging the frames inwardly to operative position, and outwardly to retracted position, is shown in Figure 5, where the three brush-frames 11, 12, and 13 are simultaneously swung through power from the single electric motor 19 which is mounted rigidly on one of the posts of the main frame of the apparatus. Power is transmitted from the motor, by the worm 20 and worm-gear 21, to the screw shaft or screw-bar 22 on which the gear is mounted, and this screw bar is journaled in horizontal position in bearings 23. The screw bar extends the distance between the two main posts of the frame and the ends of the bar are threaded for co-action with the threaded bores of two slide blocks 24, 24. As best seen in the detail view Figure 5a the blocks 24 have dovetail lugs 24' that slide in the complementary groove 23' of the bearing blocks 23, and it will be apparent that the screw bar may revolve in its bearings but does not move longitudinally. The threaded engagement of the blocks 24 with the screw bar, however, reciprocates the slide blocks 24 to impart the swinging movement to the hinged frames through the pivoted links 25 that connects the blocks with lever arms 26 fixed on the hinge-posts 14. The brush frames, which as shown in Figure 11 are hinged on the bar or rod 14, with their brushes, may with facility be swung inwardly to bring the brushes in the path of movement of the car in order that the latter may be washed, and to retract the frames for the purpose of removing the brushes when the latter are not required.

The two brushes 7 and 8 are rotated by a single electric motor 27 mounted on the brush-frame 11, and the two twin brushes 9 and 10 are rotated by power from the single electric motor 28 mounted at the top of the brush frame 13. The motor shafts 29 are provided a worm screw 30, and the latter meshes with a worm gear 31 on the operating shaft 32 of the brush 7, as best seen in Figures 6 and 7. These transmission parts of the driving means for the brushes are enclosed within the gear cases 33, and the latter are bolted by their attaching brackets 34 to the brush frames.

For the transmission of power from the operating shaft 32 of the twin brush 9 to the other twin brush 10, a set of four meshing gears are indicated by dotted lines as 35 and enclosed within the gear case 35' (as shown in Figures 1 and 2) and the last gear of this train of gears is mounted on the operating shaft 36 of the brush 10.

Preferably, the shaft sections are provided with jackets 37 for protection against water as well as dust and dirt, and some of these jackets are indicated in Figure 4, and ball bearings as 38, as well as roller bearings, are provided where necessary to insure smooth operation of the operating parts.

The individual brushes are preferably made up of sections of wooden cores 39 mounted on the brush spindles 40, and the length of a brush may thus be readily adapted for a particular purpose by varying the number of sections to the brush. Quick detachable connections are provided between each brush and its operating shaft, and for this purpose the spindle 40 of the brush is fashioned with a threaded head 41 and flange 42, the latter bearing against the adjoining face of a brush section or core, and the threaded head is fashioned with a socket-slot 43 having angular or squared walls. The end of the operating shaft is provided with a complementary squared or angular boss 44 seated in the transversely extending socket-slot, and this boss projects from the enlarged, cylindrical head 45 of the operating shaft. A union or coupling is made between the operating shaft and its brush by means of a coupling nut 46, which has an overhanging annular flange 47 engaging over the head 45 of the operating shaft, and is threaded on the threaded head 41 of the brush-spindle. By means of lugs 48 on the exterior of the nut the latter may be turned with facility for making a clamp-joint or coupling between the operating shaft and its brush, and with equal facility the nut may be removed when it is desirable or necessary to disconnect the brush from its shaft. In Figures 6 and 10 when the nut 47 has been unscrewed from the head 41 it will be seen that the angular boss 44 may be slid laterally from the socket-slot 43 to disconnect a brush from its driving shaft section. Thus, as the brush sections become worn, they may readily be removed and new sections substituted, or the brushes may quickly be dismounted for other purposes if desired.

In Figure 8 a clamp nut 49 is shown as threaded upon the lower threaded end 50 of the upper brush spindle for retaining the brush thereon in usual manner, and below this threaded portion the spindle is fashioned with a ball 51 having a bearing in socket 53 of a head 52. Above the socket 53 the head 52 is fashioned with a transverse slot having opposed flat parallel walls 54, and the spindle, above the ball has flattened sides complementary to these walls of the slot to form a driving connection. After the upper head 41 of brush 7 has been released from head 45 and boss 44, the brush may be lifted to remove the spherical head 51 of the brush spindle from socket 53. The socket head 52 is integral with the upper end of an operating shaft-section 55, which is journaled in a bearing sleeve 56.

The bearing sleeve 56 is bolted by means of the integral flange 57 to the frame 11, and other similar bearing sleeves in the two units are thus similarly attached to their respective frames.

To compensate for any slight irregularity in the axial alinement of the two brushes 7 and 8 and insure smooth transmission of the rotary movement from the upper brush to the lower brush, a flexible coupling is interposed between the two brushes, which coupling includes a universal joint 58 at the lower end of the operating section 55 of the brush shaft, a coupling bar 59 suspended from the universal joint, and a second universal joint 60 at the lower end of this bar. This universal joint 60 is located at the upper end of the shaft section 61 of the lower brush 8, and the joint is located just above one of the bearing sleeves 56, as best seen in Figure 10. The upper end of the brush 8 is secured by a quick detachable coupling to the shaft section 61 in the same manner that the upper end of the brush 7 is detachably connected with its operating shaft section 32, and the lower end of the spindle of the brush 8 is journaled in a suitable journal bearing mounted on the lower end of the frame 12.

As thus described it will be apparent that individual brushes may with facility be assembled in the desired number of sections on the spindle of the brush, and the sections of the brush operating-shafts, the brush spindles, and the flexible couplings may readily be assembled in operative position and relation. Provision is made for the use of lubricating oil or grease within the bearing sleeves, the flexible jackets that encase operating parts, and other parts requiring lubrication, and in Figures 8 and 10 especially it will be seen that rawhide, or other packing, is indicated at 38' for the ball bearings within the bearing sleeves 56.

Each of the brushes is equipped with an adjacent water pipe as 62, and these pipes may be supported in upright position at one edge of each of a brush-guard 63 in the form of a curved sheet metal plate approximately the length of the upright brush. These guards are located at the outer sides of the brushes and are firmly secured in suitable manner to the respective brushframes, to prevent waste of the water sprayed from the pipes 62, and to confine the sprayed water to the zone of the revolving brushes.

These water pipes 62, which may be provided with suitable means to insure proper distribution of the water to the brushes, are of L-shape and they extend inwardly from the outer free ends of the brush-frames toward the hinge-joints of the frames, where the pipes are provided with flexible connections or hose 64 which permit the required swinging movement of the brush frames. The hose-sections are connected to stationary, upright pipe-sections 65 located adjacent the two posts 1, 1, of the main frame, and these pipes 65 are connected to horizontal pipes 66 located near the ground line or the floor line. The horizontal water pipes are connected to the front wetting or sprinkling pipes 4, 4, and a suitable valve 67 may be used at this connection for control of flow of water to the brushes. A cross pipe 68 is indicated by dotted lines and full lines in Figures 4 and 3 to connect the water piping of the two units, one at each side of the railway track, and this pipe also connects the pipes 4 and 5.

Preferably, the water supplied to the brush-pipes is furnished with a liquid detergent, or liquid soap, and for this purpose a connection is made at 69 (Fig. 2) to one of the pipes 66 from a pipe 70 that receives the detergent, under pressure from a suitable tank, or other source of supply.

A cross pipe 71, indicated by full lines and dotted lines in Figures 3 and 4, connects the two units for the distribution of the saponified water to the brush pipes 62, it being understood that the saponified water is not distributed by the sprinkling or wetting pipes 4 and the rinsing pipes 5 at the opposite ends of the two units.

The flow of water through the main pipes 68 is controlled by a water valve 72, shown in Figure 3 enclosed within a box 73, and operated by an electro-magnetic device or solenoid device 72' located within the box or mounted on a suitable control panel.

The water control, the control of the operating mechanism for the brushes, and the control of the swinging mechanism for the brush frames, are depicted in the electric circuits or wiring shown in Figure 5, where the motor 20 for the brush-frames, and the motors 27 and 28 for the revolving brushes, are connected in the wiring diagram.

In connection with this electric control system, I also illustrate in Figure 5 a hand lever 74 which is manipulated for rendering the apparatus operative and is located at the left-hand side of the apparatus, and a second hand-lever 75 which may be manipulated for retracting the apparatus to inoperative position, and is located at the right-hand side of the track, which track in this instance is a stub track over which the car travels in one direction to be washed, and is then returned in reverse direction through the washer. I also illustrate the use of two trip levers 76 and 77, in connection with the hand levers, and these pairs of levers are connected by a connecting rod 78 which controls a circuit maker or main switch 79 for the electric circuits receiving current from a suitable source as indicated.

When hand lever 74 is swung to the left in Figure 5, the main switch 79 is closed, thereby closing the circuits for the brush motors 27 and 28, and through the electro-magnetic control 72', the valve 72 is opened to provide the water supply to the several water pipes. Current is also supplied to the frame-operating motor 19, which motor is reversible, and under control of two electro-magnetic switches 80 and 81, and the cut out or limiting switches 82 and 83. Thus when the lever 74 is moved to the left the switch 81, which is normally open, is closed and held closed by its relay while current is on, thereby supplying current to the motor 19 which supplies power to the screw bar 22, and through the action of the screw bar and its connections, the brush-frames and brushes are swung to washing position. This swinging movement of the frames is limited to a desired degree by the normally closed cut out switch 82 that is opened by contact from the lug 22' mounted on the slide 24.

On a straight-away track, where the washed car is not to be returned through the washing machine or apparatus, and after the washed car has emerged from the apparatus, the motors 27 and 28 and the water valve 72 may be rendered inoperative by swinging either lever 74 or 75 to open the main switch 79, thereby breaking the circuits to the motors and the solenoid 72'. This same movement of the lever closes the normally open motor switch 80 and permits the motor switch 81 to open, and the closing of the switch 80 supplies current to the motor 19. Motor 19 is thus energized to operate the screw 22 in reverse direction and the brush frames are swung away from the track until the lug 22' contacts with switch 83, thereby breaking the circuit and limiting the retracting swing of the frames. When the circuit is broken at 83, the solenoid of switch 80 is de-energized and both circuits of motor 19 are broken.

On the straight away track, it will be evident that this same cycle of operation may be accomplished by the use of ramps on the car or vehicle, one ramp to actuate the trip levers for closing the main switch 79 and completing the operation of rendering the washing machine units operative, and the other ramp to return the trip levers to position to open the main switch 79.

When the track is a stub-track, and the car is to be returned after washing, through the washing machine, the car, before reentering the washing machine, swings the lever 77 to retracting position in order that the brushes may be removed from the path of the washed car. After the washed car has passed out through the washing machine, i. e. from right to left, the trip lever 76 is actuated to re-set the machine in operative position in order that a succeeding car may enter from left to right to be washed.

In the modified form of the invention disclosed in Figure 12 the hinge posts 84 and 85 of the frames 11, 12, and 13, are also utilized as power shafts in the operation of the rotary brushes. If desired, a single frame may be substituted for the two frames 11 and 12 and a single brush substituted for the two brushes 7 and 8, but in either event, the brush-frames are swiveled on the power shafts 84 and 85. A single electric motor 86 is mounted on the main frame for operating the several brushes, and the motor is controlled as heretofore described, or in other suitable manner. The transmission of power from the motor to the rotary brushes is accomplished through the use of a suitable number of belts as 87 and pulleys 87' and the brush shafts or operating shafts may be as heretofore illustrated and described.

In addition to the belt-drives I also utilize gears as 88 for changing the direction of rotation of one of the twin brushes, as 10 of the pair at the right in Figure 12.

In connection with the swiveled frames of Figure 12 I illustrate a manually operated means for adjusting and swinging the brush frames into and out of operative position, and for this purpose I provide a loose lever arm 89 on the hinge posts 84 and 85. A spring rod 90 is pivotally connected at the free end of the lever arm, and at 91 this rod is anchored to the brush frame and provided with a stop nut 92. A spring 93 is interposed between the anchoring sleeve 91 and a pair of adjusting nuts 90' threaded on the spring rod, which spring, as indicated, tends to swing the lever arm 89 toward the frame post 1. By means of a coupling link 94 the rod and lever arm are pivotally connected with the free end of a crank arm 95 that is rigid with the hinge pin 96 journaled to turn in one or more of the brackets 15 attached to the main post 1.

In Figure 14 the hinge pin 97, corresponding to pin 96, is elongated in order that the manually operated adjusting mechanism may be adapted to two frames, as at the left in Figure 12, and each of these pins is oscillated or turned through the use of a hand crank as 98 which also performs the function of a clamp device for retaining the swinging frames in adjusted position.

The clamp device 98 is threaded on a threaded bolt 99 which is rigid with a slide-head 100 that is slidable in the grooved block 101 similar to the sliding movement of the block 24 in the groove 23' of Figure 5a. A link 102 is also pivoted on this bolt 99 and the link is pivotally connected to the free end of a crank arm 103 rigid with the hinge pin 96 or 97, as the case may be.

Thus it will be apparent that after the hand crank 98 has been loosened by turning on its bolt 99, the slide head 100 may be slid to the right in Figure 13, thereby swinging the frame 13 with its brushes into washing position, and after the proper washing-position of the brushes is reached, the hand crank is turned on the bolt 99 to clamp the parts rigidly in this adjusted position. When the brushes are to be retracted from washing position, the hand crank is again loosened, the slide head 100 is shifted to position of Figures 13 and 14, and the hand crank is again turned to clamp the parts in retracted position.

In Figure 12 this manually operated mechanism is shown as adapted for use with a single frame in which a short hinge pin 96 of Figure 13 is used, and at the left in Figure 12 the mechanism is shown adapted for use with two frames, as 11 and 12, where the elongated hinge pin 97 is employed.

In Figure 15, a further modification or adaptation of my invention is illustrated in a motive-fluid operated mechanism, either pneumatic or hydraulic, for swinging the brush frames to washing position, and for retracting these frames to inoperative position. As herein indicated an air cylinder 104 is mounted on each of the main frame posts 1, 1, for use in swinging the brush frames, and the piston rods 105 of these pneumatic motors are pivotally connected to the free ends of the lever arms 26 of the swinging frames 11 and 13. By the reciprocation of the usual piston in the respective cylinders 104, the frames are caused to swing on their hinge posts 14, as heretofore described. Air under pressure is supplied to the motive fluid operated mechanism from the supply pipe 106 and a control valve 107 is manually operated to permit flow of air under pressure, alternately, to the opposite ends of the two cylinders, through pipes 108. In Figure 15 the equipment for swinging the frames of only one unit is illustrated, and it will be understood that the pipes 109 extend across the washing apparatus to a complementary mechanism for the left hand unit of the apparatus.

In Figures 16 and 17 a simple type of manually operated, mechanical means is illustrated for swinging the brush frames, and in this mechanism I employ two hand levers 110 and 111 to which are connected connecting rods 112 and 113 respectively, one for each frame 12 and 13. The rods 112 and 113 are pivotally connected to the lever arms 26 of the respective frames, and the frames are designed to swing on their hinge pins or hinge posts 14. The levers 110 and 111 are provided with ratchets for locking the levers with relation to their segmental racks, and these ratchet devices as 114 may be disconnected from the levers and rendered useless if and when it is desired to connect a vehicle-actuated mechanism, or other automatically actuated mechanism with the lever mechanism.

In Figures 18 and 19 I have illustrated an automatically operating, vehicle-actuated, and electrically actuated, control mechanism especially adapted for use in washing an electric or trolley car on a stub track, and it will be understood that the car travels to the right in Figure 18, through the washing apparatus, and then, after washing, travels to the left through the washing apparatus. As here illustrated, the car is equipped on its right side with a ramp 115 which contacts with the trip lever 77, which in actual practice is located along the stub track at least a car-length beyond the washing machine. Thus, after the car has passed through the washing apparatus, and been washed, the co-action of the ramp or dog 115 and the trip 77, results in retracting the brush frames, cutting out the current for the brushes, and cutting off the water supply, as heretofore described.

On its return through the washing apparatus and after the washed car has passed along the track from the apparatus, a ramp 116 indicated by dotted lines on the left side of the car contacts with the trip 76, and the co-action of this ramp 116 and the trip lever 76 results in resetting the brushes, operating the brushes, and supplying the water for the next car that enters the washing apparatus.

As an auxiliary control, two switches 117 and 118 are provided in connection with the trolley wire 119, and these switches are properly spaced for automatic operation. As the trolley of the car passes or rides over the switch 117 the brush-operating circuits for motors 27 and 28 and the circuit for the solenoid 72' which operates the water valve are closed, thereby operating the brushes and supplying the water for washing purposes.

After the car has passed the rinsing pipe 5 the trolley encounters the automatically operated switch 118 and the current for the motors 27 and 28 and the solenoid 72' is cut off.

Having thus fully described my invention, what I claim as new and desire to secure by Letters Patent is:

1. In a car washer, the combination with a main frame and a pair of hinged brush-frames, of a lever mechanism mounted on the main frame for each brush frame, each said lever mechanism including a threaded reciprocable slide, a screw bar connecting said slides, means for turning the screw bar, and means for limiting the turning movement of the screw bar.

2. In a car washer, the combination with a main frame and a pair of hinged brush frames, of a lever mechanism for each brush frame, each said lever mechanism including a threaded reciprocable slide, a screw bar mounted in said slides, a reversible electric motor and transmission mechanism therefrom for turning said screw bar, electric circuits for said motor, a control switch for each circuit, and a circuit breaker mounted on one of said slides, for alternative coaction with said switches to control the motor and thereby limit the swinging movement of said frames.

3. In a car washing apparatus, the combination with a main frame, a hinged brush frame, a brush rotatable in the brush frame, and a water supply pipe for the brush mounted in the brush frame, of operating means mounted on the brush frame and driving means therefrom for rotating the brush, operating means mounted on the main frame and power transmission mechanism therefrom to swing the brush frame to and from operative position, means for controlling the water supply to said pipe, a common controlling means for said two operating means and the water control means, and resilient means for urging the brush frame toward the car after the brush frame has been swung to operative position.

4. In a car washing apparatus, the combination with a main frame, a hinged brush frame and a brush rotatable therein, and a water distributing pipe mounted in the brush frame adjacent the brush, of an electric motor mounted on the brush frame and driving means therefrom to the brush, a reversible electric motor mounted on the main frame and actuating means therefrom for swinging the brush to operative position, electrically operated means for controlling the water supply to said pipe, an electric system including two circuits for the motors and another circuit for the electrically operated water control means, a switch in each of said circuits, and a common control for said switches.

5. In a car washer, the combination with a main frame and a pair of hinged brush frames, of a lever mechanism for each brush frame mounted on the main frame, said lever mechanisms each including a reciprocable member, a rotary power transmitting member operatively connecting said reciprocable members whereby the rotation of the former will effect reciprocation of the latter, and means for rotating said rotary member whereby the brush frames may be swung to and from operative position.

6. In a car washer, the combination with a main frame and a pair of hinged brush frames, of a lever mechanism mounted on the main frame for each brush frame, each said lever mechanism including a threaded reciprocable slide, a screw bar connecting said slides, a motor and transmission mechanism for turning the screw bar, and means for controlling predetermined rotation of the motor in opposite directions to limit turning movement of the bar in opposite directions.

7. In a car washing apparatus, the combination with a main frame, a vertical hinge bar journaled in bearings on the main frame, and a brush frame hinged on the bar, of an electric motor mounted on the main frame and actuating means therefrom for swinging the brush frame to operative position, an electric circuit for said motor and a control switch for said circuit, a lever arm rigid with the hinge bar and said actuating means connecting the brush frame with said lever arm for urging the brush frame toward the car after the brush frame has been swung to operating position.

FRANK B. YINGLING.